Patented Nov. 1, 1938

2,135,058

UNITED STATES PATENT OFFICE 2,135,058

CATALYST FOR HYDROGEN PRODUCTION FROM HYDROCARBONS

William E. Spicer, Baton Rouge, La., and Garland H. B. Davis, New York, N. Y., assignors to Standard Oil Development Company, a corporation of Delaware.

No Drawing. Application December 15, 1932, Serial No. 647,408

10 Claims. (Cl. 23—212)

This invention relates to improved catalysts for the production of hydrogen from hydrocarbons and more particularly to catalysts active in promoting reaction of hydrocarbons with steam or other gases capable of forming reaction products with the carbon of the hydrocarbons, such as oxygen, carbon dioxide and the like.

It has been found that catalysts containing metals or compounds of metals of group VI of the periodic table are active in promoting the formation of hydrogen by reaction of hydrocarbons with steam or similar gases. Sulfides, oxides or other compounds of chromium, molybdenum, tungsten and uranium, as well as the metals themselves are included in this classification of compounds of metals of group VI. While these metals or compounds may be used alone or in admixture with each other, it will generally be found desirable to add a "promoter" or substance capable of increasing the activity of the catalyst, such as metals, oxides, sulfides or other compounds of metals of groups I to V and VII of the periodic table. Among such promoters may be mentioned the oxides, sulfides, carbonates and the like of magnesium, zinc, cadmium, boron, aluminum, silicon, cerium, thorium, vanadium and manganese. The preferred catalysts will consist of one or more of the metals or compounds of metals of group VI admixed with one or more of the above class of promoters. Naturally occurring clays, earths, or other mineral compounds containing the metals of the above class of promoters may also be used. Catalysts of great physical strength and resistance to high temperatures may be prepared with promoters in the form of ignited oxides or refractory cements, such as alundum cement. Phosphoric acid may be used as a suitable binding agent for such catalysts. In some cases the catalyst and the promoter may be chemically combined and it will be understood that this invention is not limited to the particular form or compound in which the above metals of group VI and promoters may be used in preparing the catalyst or into what forms they may be converted when used in preparing hydrogen according to the herein described processes.

The following examples are given in illustration but not in limitation of this invention.

Example 1

A catalyst containing 80% tungsten oxide and 20% magnesium oxide by weight is prepared by mixing the oxides into a paste with water, drying the paste and breaking it into lumps of suitable size for the reaction vessel employed. This catalyst is then substantially saturated with sulfur by passing hydrogen sulfide over it at 750° F. for twelve hours. A refinery gas obtained by cracking a petroleum oil and consisting substantially of methane and higher paraffin hydrocarbons with about 10% olefines, 7% hydrogen and 1% sulfur, calculated as hydrogen sulfide, is passed with 200% excess steam, based on the theoretical steam required for complete conversion of the carbon of the hydrocarbons to carbon dioxide, over the sulfided catalyst at an average temperature of 1500° F. The resulting gas, freed of water, contained 3.4% carbon dioxide, 7.8% carbon monoxide, 55.5% hydrogen, 29.4% methane and 3.8% ethylene. A very slight trace of carbon was deposited on the catalyst during 41 hours operation at a space velocity of 150 volumes of inlet refinery gas per volume of catalyst per hour.

Under similar conditions catalysts containing nickel or other metals of the iron group are quickly poisoned by the sulfur. The iron group metals and their compounds are not suitable for use as catalysts in the presence of sulfur in the herein described process, and are not within the range of this invention.

Example 2

A catalyst suitable for hydrogen production in the process described in Example 1 may be prepared by mixing 420 grams of precipitated aluminum hydroxide with 280 grams of powdered tungsten acid. 180 cc. of diluted phosphoric acid, prepared by dilution of 85% strength phosphoric acid with an equal volume of water, is then slowly added with stirring to this mixture. The resulting paste is spread on an aluminum sheet and then placed in an oven at 120° C. for 16 hours. The paste sets to a hard slab during this heating period, and is then broken into particles of suitable size for use in the hydrogen production reaction.

Bauxite or kaolin may be substituted in whole or in part for the aluminum hydroxide in the above example.

While a catalyst containing metals of group VI may be used for hydrogen production in the absence of sulfur or sulfur compounds, it is generally preferable to conduct the reaction in the presence of at least a small amount of sulfur and/or to pretreat the catalysts with sulfur containing gases. For example, hydrogen sulfide, mercaptans, thio-ethers, sulfides and polysulfides may be used to pretreat the catalyst at any temperature at which any component of the catalyst will form metallic sulfides. These gases may also be added to the hydrocarbons prior to their passage over the catalyst. Generally concentrations of about 1 to 2% sulfur in the gas used for hydrogen production will be found satisfactory, although higher or lower concentration may be used. Higher concentrations are preferred when using sulfur-containing gases for pretreating the catalyst.

The conversion of hydrocarbons to hydrogen over these catalysts is conducted preferably at a temperature of about 1000 to 1800 or 1850° F. although higher or lower temperatures may be used, depending upon the activity of the catalyst and the extent of conversion desired. If the catalyst contains compounds which are capable of subliming, such as molybdenum oxide, the reaction should be conducted under conditions of temperature and pressure at which sublimation is substantially inappreciable.

The hydrocarbon conversion may be conducted at atmospheric pressure or at pressures below or above atmospheric. If pressures above atmospheric are used, it will be found desirable to conduct the reaction at a higher temperature or with higher steam-hydrocarbon ratios than are used at atmospheric pressure, in order to offset the adverse equilibrium effect of increased pressure. The amount of steam used is generally about 100 to 300% in excess of that necessary for reaction with the total carbon in the gas but much greater amounts of steam will be found desirable if the reaction is conducted at superatmospheric pressure. For example at 16 to 25 atmospheres pressure and 1400 to 1600° F., steam may suitably be about 2000% in excess of that required for the reaction.

It may be found desirable, especially in cases of long continued operation to treat the catalyst with oxidizing gases such as oxygen or steam, and/or reducing gases such as hydrogen, to remove small amounts of deposited carbon and to maintain the activity of the catalyst at a high level. Such periodic treatments are especially desirable when producing hydrogen from cracked petroleum gases, or other gases containing large amounts of unsaturated hydrocarbons. Such reactivating treatments are suitably conducted at about the same temperature used for hydrogen production.

The conversion of the hydrocarbons may be conducted by passing the gases over the above described catalysts arranged in externally heated tubes or other suitably shaped reaction vessels. The reaction vessels may also be heated either partially or entirely by internal means, by supplying oxygen or oxygen containing gases to the gases undergoing reaction, as will be understood. Oxygen or gases containing free or combined oxygen, such as air or carbon dioxide, may be used in partial or total substitution for the steam.

These catalysts may be used for the substantially complete conversion of hydrocarbons to hydrogen and oxide of carbon. For example, if the catalyst shown in Example 1 is used under the same conditions except that the temperature is raised to about 1800 to 1850° F., the converted gas will contain not more than about 2% methane. This catalyst may also be used for a partial conversion of the hydrocarbons in the event that the hydrocarbon gases contain organic sulfur compounds. In such a case the organic sulfur compounds are converted substantially to hydrogen sulfide which may be readily removed with lime, iron oxide, or with caustic soda or other suitable alkaline solutions. The completion of the conversion of the sulfur-free gases may then be effected with highly active sulfur sensitive catalysts, such as nickel, promoted with magnesia and/or alumina.

If substantially pure hydrogen is desired, the gases leaving the above described hydrocarbon conversion steps, which gases will usually be found to contain relatively large amounts of carbon monoxide, may be led with steam over suitable catalysts for the conversion of the carbon monoxide to carbon dioxide which may then be removed by ordinary absorption methods. It is desirable to use catalysts for this carbon monoxide conversion step which are insensitive to sulfur if the prior hydrocarbon conversion step has been conducted in the presence of appreciable amounts of sulfur. Among suitable sulfur insensitive carbon monoxide conversion catalysts may be mentioned those containing oxides and suitable compounds of chromium.

This invention is not to be limited to any particular catalyst composition which has been described herein solely for purpose of illustration, nor to any theory regarding the activity of our improved catalysts, but only by the following claims in which we wish to claim all novelty insofar as the prior art permits.

We claim:

1. Process for the production of hydrogen by reaction of hydrocarbons with steam comprising passing a mixture of hydrocarbons containing sulfur and steam at an elevated temperature over a catalyst comprising, as a primary catalytic element, a metal of group VI of the periodic table, said catalyst being free from metals of the iron group.

2. Process for the production of hydrogen by reaction of hydrocarbons with steam comprising passing a mixture of hydrocarbons containing sulfur and steam at an elevated temperature over a catalyst comprising, as a primary catalytic element, a compound of a metal of group VI of the periodic table, said catalyst being free from metals of the iron group.

3. Process for the production of hydrogen by reaction of hydrocarbons with steam comprising passing a mixture of hydrocarbons containing sulfur and steam at an elevated temperature over a catalyst comprising, as a primary catalytic element, a compound from the group consisting of oxides and sulfides of metals of group VI of the periodic table, said catalyst being free from metals of the iron group.

4. Process for the production of hydrogen by reaction of hydrocarbons with steam comprising passing a gas containing a mixture of hydrocarbons and sulfur and steam at an elevated temperature over a catalyst comprising a tungsten compound selected from the group consisting of oxides and sulfides of tungsten, and a promoter selected from the group consisting of oxides of magnesium, zinc, aluminum, and thorium, said catalyst being free from metals of the iron group.

5. A process for the production of hydrogen which comprises contacting a mixture of steam and hydrocarbons containing sulfur at an elevated temperature with a catalyst containing a major proportion by weight of a metal of the 6th group of the periodic system combined with sulfur.

6. A process for the production of hydrogen which comprises contacting a mixture of steam and hydrocarbons containing sulfur at an elevated temperature with a catalyst containing a major proportion by weight of tungsten combined with sulfur.

7. In a catalytic process for the preparation of hydrogen from a mixture of steam and hydrocarbons containing sulfur, preparing a catalyst containing a major proportion by weight of a metal of the sixth group of the periodic system combined with sulfur and bringing said mixture at elevated temperature in contact with said catalyst.

8. In a catalytic process for the preparation of hydrogen from a mixture of steam and hydrocarbons containing sulfur, preparing a catalyst containing a major proportion by weight of tungsten combined with sulfur and bringing said mixture at elevated temperature in contact with said catalyst.

9. In a catalytic process for the preparation of hydrogen from a mixture of steam and hydrocarbons containing sulfur, preparing a catalyst comprising a metal of the sixth group of the periodic system combined with sulfur and bringing said mixture at elevated temperature in contact with said catalyst, the said catalyst being free from metals of the iron group.

10. In a catalytic process for the preparation of hydrogen from a mixture of steam and hydrocarbons containing sulfur, preparing a catalyst comprising tungsten combined with sulfur and bringing said mixture at elevated temperature in contact with said catalyst, the said catalyst being free from metals of the iron group.

WILLIAM E. SPICER.
GARLAND H. B. DAVIS.